H. N. HILL.
Corn Husker.

No. 67,301.

Patented July 30, 1867.

Witnesses

Inventor

United States Patent Office.

H. N. HILL, OF PONTIAC, MICHIGAN.

Letters Patent No. 67,301, dated July 30, 1867.

IMPROVEMENT IN CORN-HUSKER.

The Schedule referred to in these Letters Patent and making part of the same.

TO ALL WHOM IT MAY CONCERN:

Be it known that I, H. N. HILL, of Pontiac, in the county of Oakland, and State of Michigan, have invented a new and improved Corn-Husker; and I do hereby declare that the following is a full, clear, and exact description thereof, which will enable others skilled in the art to make and use the same, reference being had to the accompanying drawings, forming a part of this specification.

This invention relates to an arrangement for cutting the ears of corn from the stem, and thereby clearing the husks from the corn; and it consists in arranging two knives, one of which is stationary, and the other is attached to a slide, and is operated with the foot, as I will proceed to describe.

Figure 1:
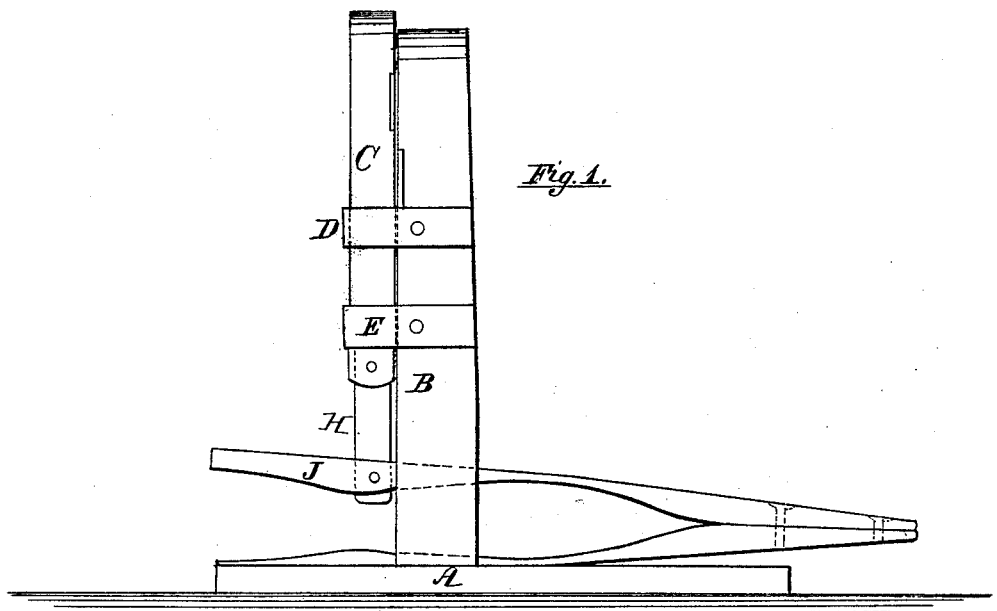
Figure 2:
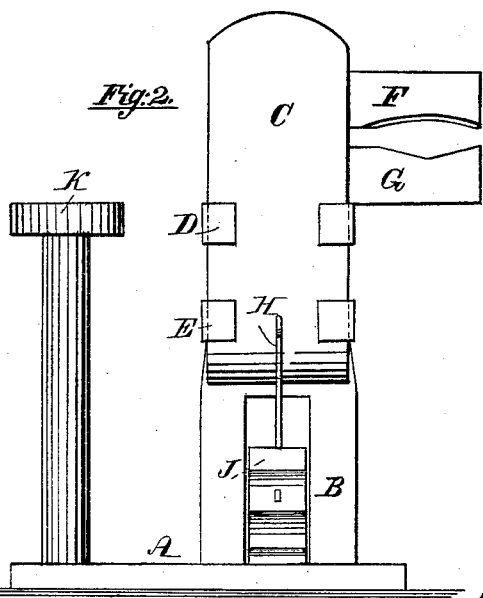

Figure 1 represents a side elevation of the machine, showing the stationary post and the slide, together with the spring Figure 2 is a front view, showing the knives.

Similar letters of reference indicate corresponding parts.

A represents the platform, to which the parts are attached. B is an upright post, firmly attached to the platform A. C is the slide. D and E are bands or clips firmly attached to the post B, which surrounds the slide C, so that it is kept in place while it is allowed to slide up and down on the face of the post. F and G are the knives. G is the stationary knife, which is attached to the post. F is attached to the slide C, and moves with it. H is a bar, which connects the slide C with the treadle. J is the treadle. This treadle is formed in two parts, both of which are springs. The lower portion is attached to the platform, and the two are connected together by bolts, or in any other substantial manner. The stem of the corn is brought between the knives, when the knife F is brought down with the foot, thus severing the stem and releasing the husks. K is the seat, so arranged that the operator can either sit or stand when husking.

What I claim as new, and desire to secure by Letters Patent, is—

1. The knives F and G, in combination with each other and the spring-treadle J, substantially as described for the purposes set forth; and 2. I claim the slide C and the spring-treadle J, arranged and operating substantially as described, in combination with the knives F and G, as and for the purposes herein set forth.

H. N. HILL.

Witnesses:
   A. PARKER,
   H. M. LINABURY.